Figure 1:
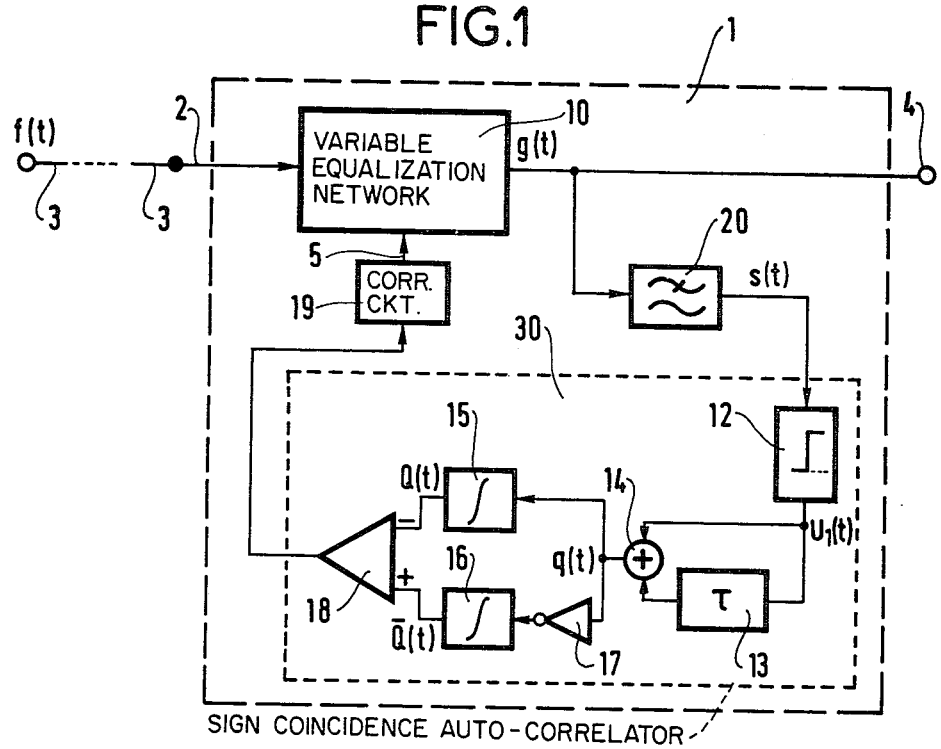

United States Patent [19]

Lemoussu et al.

[11] 4,243,956
[45] Jan. 6, 1981

[54] AUTOMATIC EQUALIZER FOR A SYNCHRONOUS DIGITAL TRANSMISSION SIGNAL

[75] Inventors: Michel Lemoussu, Saint Michel sur Orge; Claude Cardot, Gif-sur-Yvette, both of France

[73] Assignee: Compagnie Industrielle des Telecommunications cit Alcatel, Paris, France

[21] Appl. No.: 19,245

[22] Filed: Mar. 9, 1979

[30] Foreign Application Priority Data

Mar. 10, 1978 [FR] France .............................. 78 06953

[51] Int. Cl.³ .............................................. H04B 3/08
[52] U.S. Cl. ........................................ 333/18; 375/12
[58] Field of Search ................. 333/18; 325/42, 65, 325/323; 364/604, 728; 455/63; 375/12, 14–16

[56] References Cited

U.S. PATENT DOCUMENTS 3,368,168 2/1968 Lucky ..................... 333/18
3,736,414 5/1973 McAuliffe ................. 333/18 X
3,736,530 5/1973 MacLean ................... 333/18

OTHER PUBLICATIONS

Kirlin, *Correlation and Fourier Analysis in Real Time, Inexpensively,* Proc. of IEEE, vol. 64, No. 9, Sep. 1976, pp. 1440–1442.

*Primary Examiner*—Paul L. Gensler
*Attorney, Agent, or Firm*—Roland Plottel

[57] ABSTRACT

The present invention comes within the field of synchronous digital transmission. It provides an automatic variable equalization network (1) equipped with phase-locking means, in which a sign coincidence autocorrelator (30) correlates the polarities of two versions of the equalized signal delayed in relation to each other by $\tau$, an integer multiple of the unit time interval of the transmission. It is used advantageously for equalizing synchronous digital transmission channels in switched telephone or telegraph networks.

5 Claims, 4 Drawing Figures

AUTOMATIC EQUALIZER FOR A SYNCHRONOUS DIGITAL TRANSMISSION SIGNAL

The invention comes within the field of transmission. Equalization is the compensation of linear distortions due to a transmission channel. Such compensation is provided by means of corrector circuits called equalizers which are inserted in the transmission channel and which fulfil the transfer functions such that the overall response obtained has a flat amplitude and a linear phase in the frequency band occupied by the transmission signals. An equalizer is referred to as being automatic when it has a variable transfer function adjusted from the equalized signal which allows it to be adapted to the characteristics of an imperfectly known transmission channel as is the case for example with a transmission channel in a switched telephone or telegraph network.

The present invention relates more particularly to automatic equalizers which have a transfer function depending only on one parameter whose value is determined from characteristics of the equalized signal.

Automatic equalizers of this type are used in digitial transmission systems which use cables with repeaters to equalize variable lengths of cable. In particular, the equalizer described in published French Pat. No. 2,128,152 can be mentioned, said equalizer including a variable equalization network adjusted by means of a DC voltage which depends on the peak value of the equalized signal.

The present invention provides an automatic equalizer for digital transmission of constant unit time interval, said equalizer including a variable equalization network equipped with a feed back control loop, which includes a sign coincidence autocorrelator which correlates the polarities of two versions of the equalized signal one of which versions is delayed in relation to the other version by an integer multiple of the unit time interval.

The automatic equalizer preferably further includes a predistortion filter disposed at the input of the sign coincidence autocorrelator.

Figure 2:
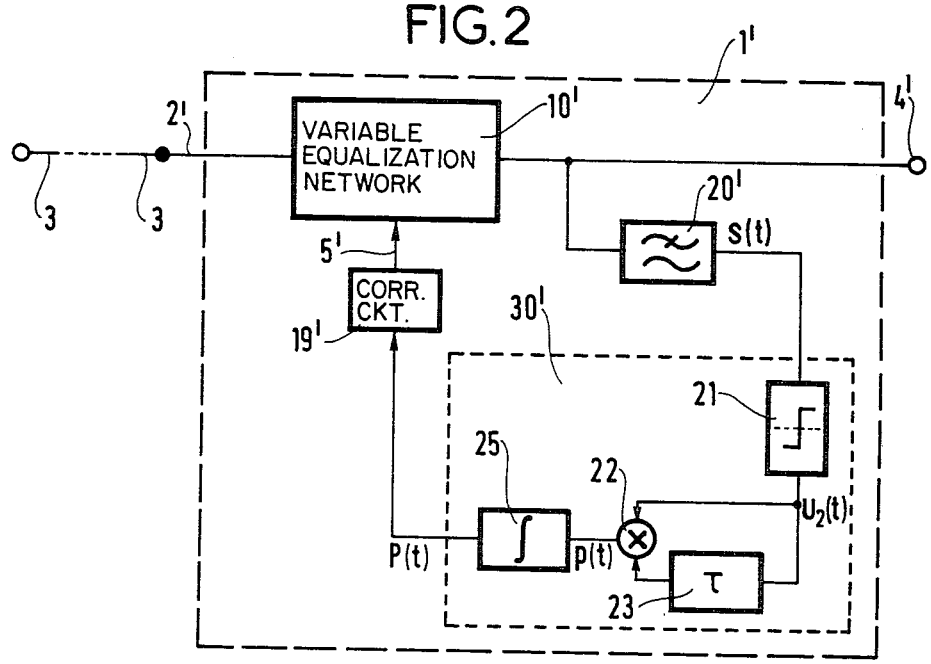
Figure 3:
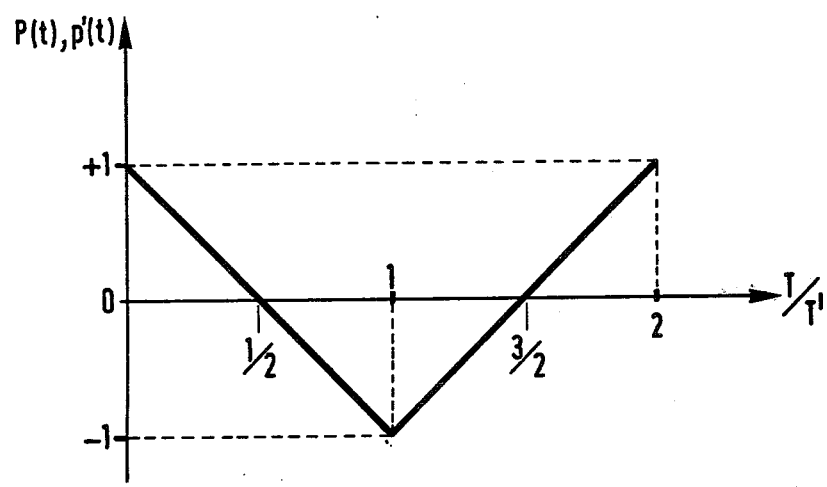
Figure 4:
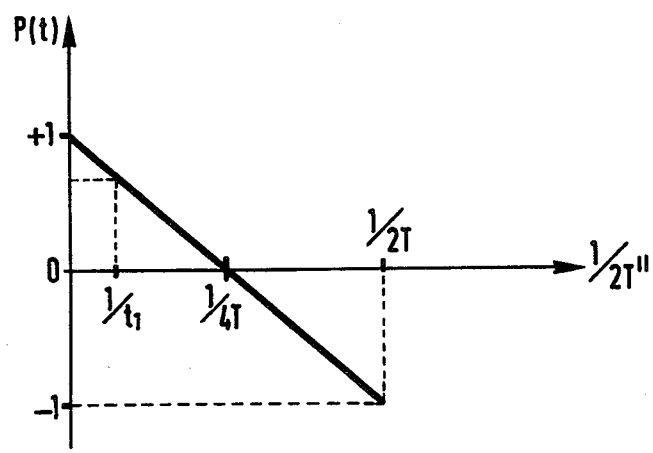

Two embodiments of the invention are described by way of example with reference to the accompanying drawings in which:

FIGS. 1 and 2 are block diagrams of two automatic equalizers in accordance with the invention; and FIGS. 3 and 4 are graphs which illustrate the operation of the equalizers illustrated in FIGS. 1 and 2.

FIGS. 1 and 2 each show an automatic equalizer 1, 1', having a signal input 2, 2' connected to the output of a synchronous digital transmission channel 3 represented by a dashed line and having a signal output 4, 4' from which the equalized transmission signal is available. Each automatic equalizer 1, 1' includes a variable equalization network 10, 10' equipped with a feed back control loop.

The variable equalization networks 10, 10' have signal inputs and outputs which coincide with those 2, 2', 4, 4' of the automatic equalizers 1, 1' as well as inputs 5, 5' which adjust their transfer function.

They are of known type and are determined as a function of the type of channel in question. Their variable transfer function can be adjusted to that of the transmission channel actually used by adjusting an adjustment parameter whose value is a function of the distortions of the equalized signal. A detailed example thereof is given in French Pat. No. 2,128,152. They will not be further considered in the following part of the description, since they are not a part of the present invention. It will simply be stated that an increase in the value of the adjustment parameter causes an increase in the band width of the equalized signal and vice-versa and that consequently, the value of the control signal must increase with the distortions which affect the equalized signal.

The control loops which each connect the output of a variable equalization network 10, 10' to its adjustment input include a pre-distortion filter 20, 20' followed by a sign coincidence autocorrelator 30, 30' and by a correction circuit 19, 19' which ensures control stability. They differ essentially in the structures of their sign coincidence autocorrelators which, however, deliver the same output signal.

The sign coincidence autocorrelator 30 of the automatic equalizer 1 illustrated in FIG. 1 includes:

an absolute limiter 12;

an adder 14 with two inputs, each of which is connected to the output of the absolute limiter 12, one directly and the other via a delay circuit 13;

the delay circuit 13;

two integrators 15 and 16 connected to the output of the adder 14, one directly and the other via a logic inverter circuit 17;

the logic inverter circuit 17; and a differential amplifier 18 whose inputs are connected to the outputs of the integrators 15 and 16.

The signal s(t) applied to the input of the sign coincidence autocorrelator is received by the absolute limiter 12 which delivers in response a logic signal $u_1(t)$ whose level is, by definition, 1 if the input signal s(t) is positive and 0 in the contrary case. The delay circuit 13 receives the signal $u_1(t)$ and delays it by one period $\tau$. The adder performs the "exclusive OR" logic function. One of its inputs receives the signal $u_1(t)$ which comes from the absolute limiter 12 and its other input receives the same signal delayed by one period $\tau$ by the delay circuit 13. Its output delivers a signal q(t) applied to the integrator 15 whose integration constant is $t_1$ and whose output signal Q(t) can be expressed by the equation:

$$Q(t) = \frac{1}{t_1} \int_{t_0}^{t_0 + t_1} q(t) \, dt \qquad (q(t) = 0 \text{ or } 1)$$

The signal q(t) is also complemented and applied to the integrator 16. The integrator 16 has the same integration constant $t_1$ as the integrator 15 and delivers an output $\overline{Q}(t)$ whose form is:

$$\overline{Q}(t) = \frac{1}{t_1} \int_{t_0}^{t_0 + t_1} \overline{q}(t) \, dt$$

The signals Q(t) and $\overline{Q}(t)$ are related to each other by equation:

$$\overline{Q}(t) = 1 - Q(t)$$

The output of the differential amplifier 18 supplies a signal r(t) equal to:

$$r(t) = \overline{Q}(t) - Q(t) = 1 - 2Q(t) \qquad (1)$$

The sign coincidence autocorrelator 30' of the automatic equalizer illustrated in FIG. 2 includes:

an absolute limiter 21 disposed at the input;

a multiplier 22 with two inputs each connected to the output of the absolute limiter, one directly, the other via a delay circuit 23;

the delay circuit 23; and an integrator disposed connected to the output of the multiplier 22.

A signal s(t) applied to the input of the sign coincidence autocorrelator is received by the absolute limiter 21 whose output delivers a signal $u_2(t)$ which is, by definition, a binary signal equal to $+1$ if s(t) is positive and to $-1$ in the contrary case. The signal $u_2(t)$ is applied without delay to one input of the multiplier 22 and with a delay of $\tau$ to the other input. This generates at the output of the multiplier 22 a signal p(t) which is related to the signal q(t) of the logic "exclusive OR" gate 14 of the preceding circuit by the equation:

$$p(t) = 1 - 2q(t)$$

The output of the integrator 25 whose integration time constant is $t_1$ delivers a signal P(t) related to the signal p(t) by the equation:

$$p(t) = \frac{1}{t_1} \int_{t_0}^{t_0 + t_1} p(t)\, dt \quad (p(t) = \pm 1)$$

The signals p(t) and Q(t) are related to each other by the same equation as p(t) and q(t):

$$p(t) = 1 - 2Q(t)$$

It is deduced from equation (1) that the sign coincidence autocorrelators of the automatic equalizers illustrated in FIGS. 1 and 2 have the same output signal P(t).

The delay circuits 13 and 23 which process only binary signals can be formed by means of shift registers which have n stages and operate at a frequency of $n/\tau$, n being an integer chosen so as to obtain an acceptable compromise between the cost of the registers and the precision of the autocorrelators.

The integrators 15, 16 and 25 can be formed by means of low-pass filters with a time constant $t_1$.

The predistortion filters 20, 20' used in the automatic equalizers 1, 1' illustrated in FIGS. 1 and 2 must be such that the distortion which they cause can be at least partially corrected by the variable equalization networks 10, 10'. Advantageously, they simulate a given length of the transmission channel used. In the case of a transmission channel which operates like a low-pass filter, they can be constituted, as will be seen further on, by low-pass filters which have a cut-off frequency equal to $\frac{1}{4}T$ (where T is the unit time interval of the synchronous digital transmission in question.

The correction circuits 19, 19' which stabilize the control means can be formed by means of low-pass filters.

During experiments, it has been observed that the automatic equalizers described with reference to FIGS. 1 and 2 were particularly adaptable when the delay $\tau$ of the delay circuits 13 and 23 was chosen to be equal to an integer multiple of the unit time interval of the synchronous digital transmission in question and that the integration period $t_1$ was chosen to be long with respect to the unit time interval.

This property can be explained by the fact that the signal supplied by the control means for adjusting the variable equalization networks 10, 10' is a much more exact representation of the linear distortion which affects the equalized signal than the signals used for the same purpose in automatic equalizers of the prior art.

To describe the operation of the control means of the automatic equalizers described with reference to FIGS. 1 and 2, it will be shown that due to their sign coincidence autocorrelators, their output signals are representative of the differences between the period of a time interval which separates the consecutive zero passes of the output signal s(t) of the predistortion filters 20, 20' from the period T, then, by means of a simple example, that these differences are the first to be affected by the linear distortions undergone by a synchronous digital transmission signal.

Take a signal s(t) which includes zero passes separated by a time interval T'. An example of a signal of this type applied to the input of the absolute limiter 21 of the block diagram of FIG. 2 can be, if the origin of the periods chosen is a zero pass of the signal:

$$s(t) = \sin\pi \frac{t}{T'}$$

The signal $\mu_2(t)$ at the output of the absolute limiter 21 is expressed as:

$$\mu_2(t) = \operatorname{sgn} s(t) = \operatorname{sgn} \sin\pi \frac{t}{T'},$$

Taking the delay $\tau$ caused by the circuit 23 as equal to T, the two signals applied to the multiplier 22 are:

$$\operatorname{sgn} \sin\pi \frac{t}{T'}, \text{ and } \operatorname{sgn} \sin\pi \frac{t - T}{T'}$$

The output signal p(t) of the multiplier 22 is therefore $$p(t) = \operatorname{sgn} \sin\pi \frac{t}{T'} \cdot \operatorname{sgn} \sin\pi \frac{t - T}{T'}$$
$$= \operatorname{sgn} (\sin\pi \frac{t}{T'} \cdot \sin\pi \frac{t - T}{T'})$$
$$= \operatorname{sgn} (\cos\pi \frac{T}{T'} - \cos\pi \frac{2t - T}{T'})$$

On examining the preceding expression, it will be seen that the parenthesis remains negative when T is equal to T' except for particular values of t such as $$\cos\pi \frac{2t - T}{T'} = 1$$

where it is zero.

Besides these particular values of t, we have:

$$p(t) = -1$$

therefore the average value p'(t) of the signal p(t) over any period is equal to $-1$.

Similar reasoning to that used for $T/T' = 1$ shows that where $T/T' = 0$ and $T/T' = 2$, the averge value p'(t) of the signal p(t) is equal to $+1$.

Where T/T' is not an integer, p(t) is a periodic function of T', and the average value p'(t) of p(t) can therefore be calculated over a period which is an integer multiple of T' and in particular over a period T'. For values of T/T' which are not integer values and lie between the intervals (0,1) and (1,2), the parenthesis of the expression of p(t) is positive for a part of the time and p'(t) is greater than −1. It can be shown that p'(t) varies linearly from −1 to +1 when the ratio T/T' varies from 1 to 0 and from 1 to 2.

The preceding calculation still applies in the case where the time intervals which separate the consecutive zeros of the input signal s(t) are all equal to the value T' over the integration time $t_1$, which is supposed to be large with respect to the unit interval T. Therefore, in this new case, the signal P(t) has the same variations in relation to T/T' as those found for the signal p'(t) in the preceding case.

FIG. 3 shows either the variation of the signal p'(t) as a function of the ratio T/T' in the case where T' is considered as an interval of time which separates two consecutive zeros of the input signal s(t), or the variation of the signal P(t) as a function of the ratio T/T' in the case where T' is considered as the value of each time interval which separates the consecutive zeros of the input signal s(t) over a time period $t_1$, said time intervals being supposed identical.

It is deduced from FIG. 3 that the signal p'(t) is at its minimum level only when T is equal to T' and that its value is independent from the sign of the difference between T and T'. Since the integration period is long with respect to the unit time interval T, these properties are also those of the signal P(t), which is therefore at its minimum value only when the time intervals T' which separate the consecutive zeros of the input signal s(t) are each directly equal to T. The difference between the signal P(t) and its minimum value is representative of the average value of the differences, taken in absolute value, between the time intervals T' and the time intervals T or, more simply, it is representative of the regularity of the zero passes of the input signal s(t).

The periods of the time intervals between the consecutive zeros of a synchronous digital transmission signal are the first to be affected by the linear distortions. This can be shown by calculation in the simplified case where the transmission channel and the equalization network are likened to an ideal low-pass filter with a rectangular spectrum whose cut-off frequency is $\frac{1}{2}T''$ and where it is supposed that the emission signal f(t) is an isolated pulse with a rectangular spectrum whose width is $\frac{1}{2}T$.

The pulse response h(t) of the transmission channel and of the equalization network has the form:

$$h(t) = K_1 \frac{\sin\pi \frac{t}{T''}}{t} \quad K_1 \text{ constant}$$

The emission signal f(t) has the form:

$$f(t) = K_2 \frac{\sin\pi \frac{t}{T'}}{t} \quad K_2 \text{ constant}$$

The signal g(t) obtained in response at the output of the equalization network is equal to the convolution of the pulse response h(t) by the signal f(t).

$$g(t) = \int_{-\infty}^{+\infty} f(\tau)h(t-\tau)d\tau$$

whence $$g(t) = K_1 K_2 \int_{-\infty}^{+\infty} \frac{\sin\pi \frac{\tau}{T'} \cdot \sin\pi \frac{t-\tau}{T''}}{\tau(t-\tau)} d\tau$$

$$g(t) = K_1 K_2 \pi \frac{\sin\pi ct}{t},$$

where $c = \min\left(\frac{1}{T'}, \frac{1}{T''}\right)$

The preceding expression shows that the received signal g(t) is identical to the emitted signal if T'' is less than or equal to T. In that case, emitted signal has not undergone any distortion and on reception, still has zero passes separated by the unit time interval T. In contrast, if T'' is greater than T, the emitted signal undergoes distortion since it loses a part of the higher frequencies of its spectrum. The spacing of its zero passes is modified and becomes T'''.

Still considering the preceding case and omitting the predistortion filters 20, 20' a signal P(t) would be provided at the output of the sign coincidence autocorrelators 30, 30', the signal p(t) remaining at its minimum value for as long as the cut-off frequency $\frac{1}{2}T''$ remains greater than $\frac{1}{2}T$ and tending linearly towards a maximum value +1 which is reached when there are no more zero passes in the integration period. FIG. 4 is a graph which shows the variation of the signal P(t) as a function of the cut off frequency $\frac{1}{2}T''$ evaluated with respect to the time interval T.

The preceding calculation therefore shows, for an emission signal formed by an isolated pulse with a rectangular spectrum and an equalized transmission channel which can be likened to an ideal low-pass filter, that the linear distortion due to the transmission channel affects the time intervals between the successive zeros of the received signal. Experiment and simulation on a computer confirm that the result remains the same when the transmission channel is a real filter and the emission signal is a synchronous digital signal with a unit time interval T, constituted by a random succession of elementary pulses which can have any spectrum. They also show that the linear distortions have a cumulative effect on the differences, taken in absolute value, between the unit time interval T and the time intervals which separate the consecutive zeros of the received signal. The same applies when the effect of the transmission channel is not an amplitude distortion but a distortion of the group propagation time which affects a part of the frequency spectrum of the emitted signal.

The predistortion filter 20, 20' overcomes the difficulty due to control on the basis of the extreme values of the voltage P(t) and allows a control signal to be obtained which changes sign when the automatic equalizer 1, 1'' moves away from its optimum adjustment. When the automatic equalizer compensates the transmission channel exactly; its function is to cause modifications in the time intervals which separate the successive zeros of the signal applied to the sign coincidence autocorrelator which lead to a zero value of the signal P(t). As shown in FIG. 4, it can be effected by means of a low-pass filter which has a cut-out frequency equal to $\frac{1}{4}T$. For the signal P(t) to be able to vary on either side of its zero value, the variable equalization network 10, 10' must be able to equalize at least partially the predistortion filter 20 and 20', which must not cut out too suddenly.

Without going beyond the scope of the invention, some dispositions can be modified or some means can be replaced by equivalent means. In particular, delay circuits 13, 23 whose delay is $\tau$ which is an integer multiple of the unit time interval of order greater than 1 can be used in sign coincidence autocorrelators.

We claim:

1. An automatic equalizer for compensating for the linear distortion experienced by a digital signal when transmitted over a transmission channel 3, said digital signal comprising a train of digital pulses of a constant unit time interval, the equalizer comprising:
   (a) a variable equalization network 10 having a feedback control loop comprising:
      (1) a sign-coincidence auto-correlator 30 for correlating the polarities of a first and a second version of the equalized signal; and
      (2) means for delaying 13 the second version of the equalized signal with respect to the first version by an integer multiple of said unit time interval.

2. The equalizer according to claim 1, further comprising:
   a pre-distortion filter 20 connected between the signal output of said variable equalization network and the input of said sign-coincidence, auto-correlator, said pre-distortion filter at least simulating the distortion caused by a portion of said transmission channel, said distortion being at least partially correctable by said variable equalization network.

3. An automatic equalizer according to claim 2, wherein said signal coincidence autocorrelator includes:
   an absolute limiter 12 connected to its input, the output of said limiter delivering a logic signal whose level is +1 if its input signal is positive and 0 in the contrary case;
   an "exclusive OR" logic gate 14 with two inputs each connnected to the output of the absolute limiter, one directly, the other via said delay means;
   a logic inverter circuit 17;
   first and second integrators 15, 16 connected to the output of said "exclusive OR" logic gate, one directly, the othr via said logic inverter circuit; and
   a differential amplifier 18 whose inputs are connected to the outputs of said first and second integrators.

4. An automatic equalizer according to claim 2, wherein said sign-coincidence autocorrelator includes:
   an absolute limiter 21 connected to its input, the output of said limiter delivering a binary signal whose level is +1 if its input signal is positive and −1 in the contrary case;
   a multiplier 22 with two inputs each connected to the output of the absolute limiter, one directly, the other via said delaying means;
   an integrator 25 connected to the output of the multiplier.

5. An automatic equalizer according to claim 2, wherein said predistortion filter 20 comprises a low-pass filter whose cut-off frequency is $\frac{1}{4}T$, where T is the duration of said unit time interval.

* * * * *